United States Patent [19]
de Laine et al.

[11] 3,730,211
[45] May 1, 1973

[54] SPRINKLER IRRIGATION SYSTEMS

[76] Inventors: Robert James de Laine, 1 Montrose Court, Murrumbeena; William Richard Clifford Geary, Flat 4, 18 Kensington Road, South Yarra, Victoria, both of Australia

[22] Filed: Apr. 21, 1971

[21] Appl. No.: 135,863

[30] Foreign Application Priority Data

Apr. 22, 1970 Australia..............................0982/70
Dec. 21, 1970 Australia..............................3551/70

[52] U.S. Cl..................................137/344, 239/212
[51] Int. Cl...........................B05b 9/02, E01h 3/02
[58] Field of Search...................239/190, 191, 272, 239/213; 137/344

[56] References Cited

UNITED STATES PATENTS

| | | | |
|---|---|---|---|
| 3,386,661 | 6/1968 | Olson et al. | 239/212 X |
| 1,223,246 | 4/1917 | Bohnenkemper | 239/197 |
| 2,604,359 | 7/1952 | Xubach | 239/191 X |
| 2,807,500 | 9/1957 | Clayton | 239/191 X |
| 2,893,643 | 7/1959 | Gordon | 137/344 |
| 2,941,727 | 6/1960 | Zybach | 239/212 X |
| 3,259,319 | 7/1966 | Wallace | 239/212 X |
| 3,500,856 | 3/1970 | Boone et al. | 137/344 |
| 3,605,928 | 9/1971 | Loesch | 137/344 X |
| 3,610,531 | 10/1971 | Erickson | 239/191 |

FOREIGN PATENTS OR APPLICATIONS

734,313  5/1966  Canada.............................239/191

*Primary Examiner*—Samuel Scott
*Attorney*—Cushman, Darby & Cushman

[57] ABSTRACT

This specification discloses a sprinkler irrigation system comprising a sprayline swivelly secured to a central water hydrant, a plurality of hydraulic towing devices connected to said sprayline and driven by the water therein, said towing devices being interconnected by a tie line swivelly secured to the hydrant and constraining the towing devices to more in a circular path. The outermost towing device controls the rate of movement of the whole system through control means connected to each intermediate towing device and operated by changes in the angular position of the tie line relative to the intermediate towing device.

12 Claims, 15 Drawing Figures

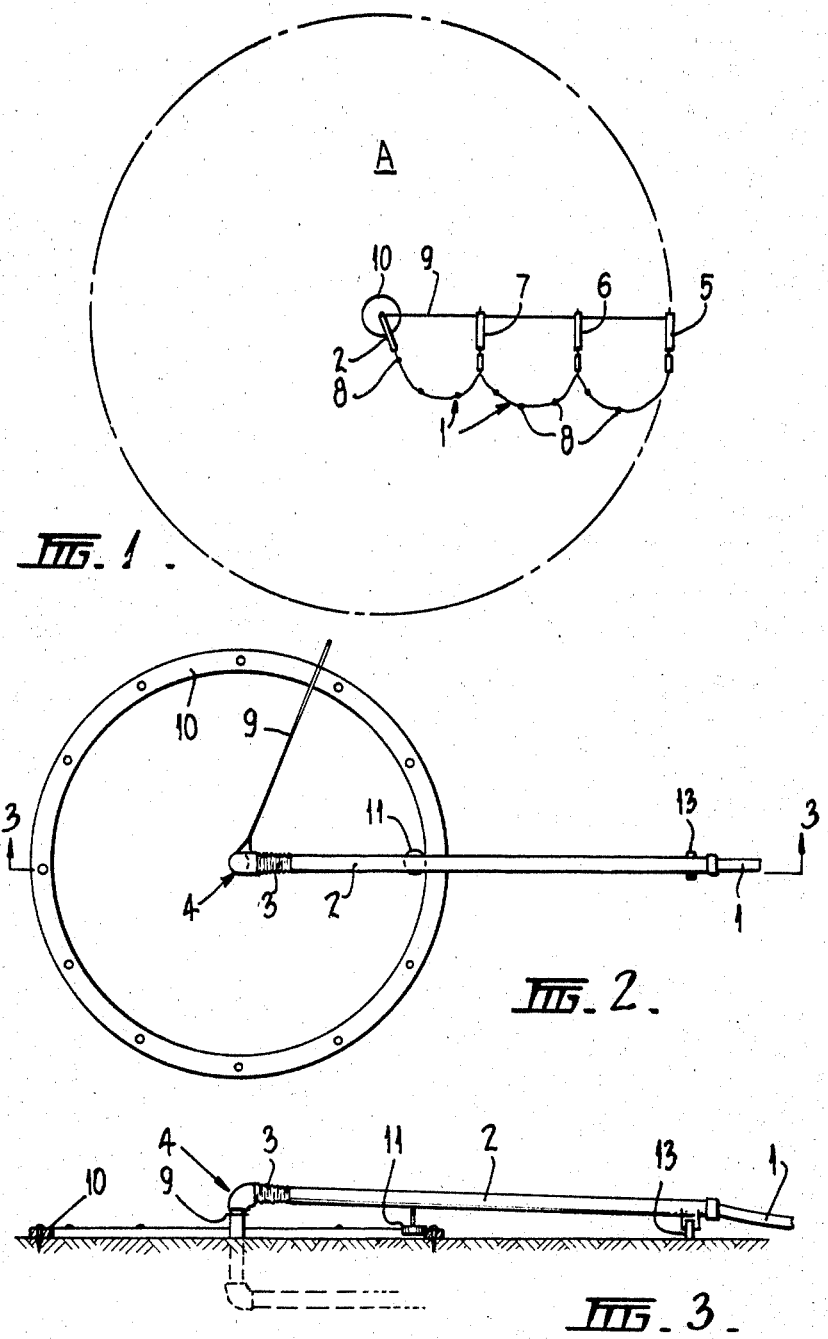

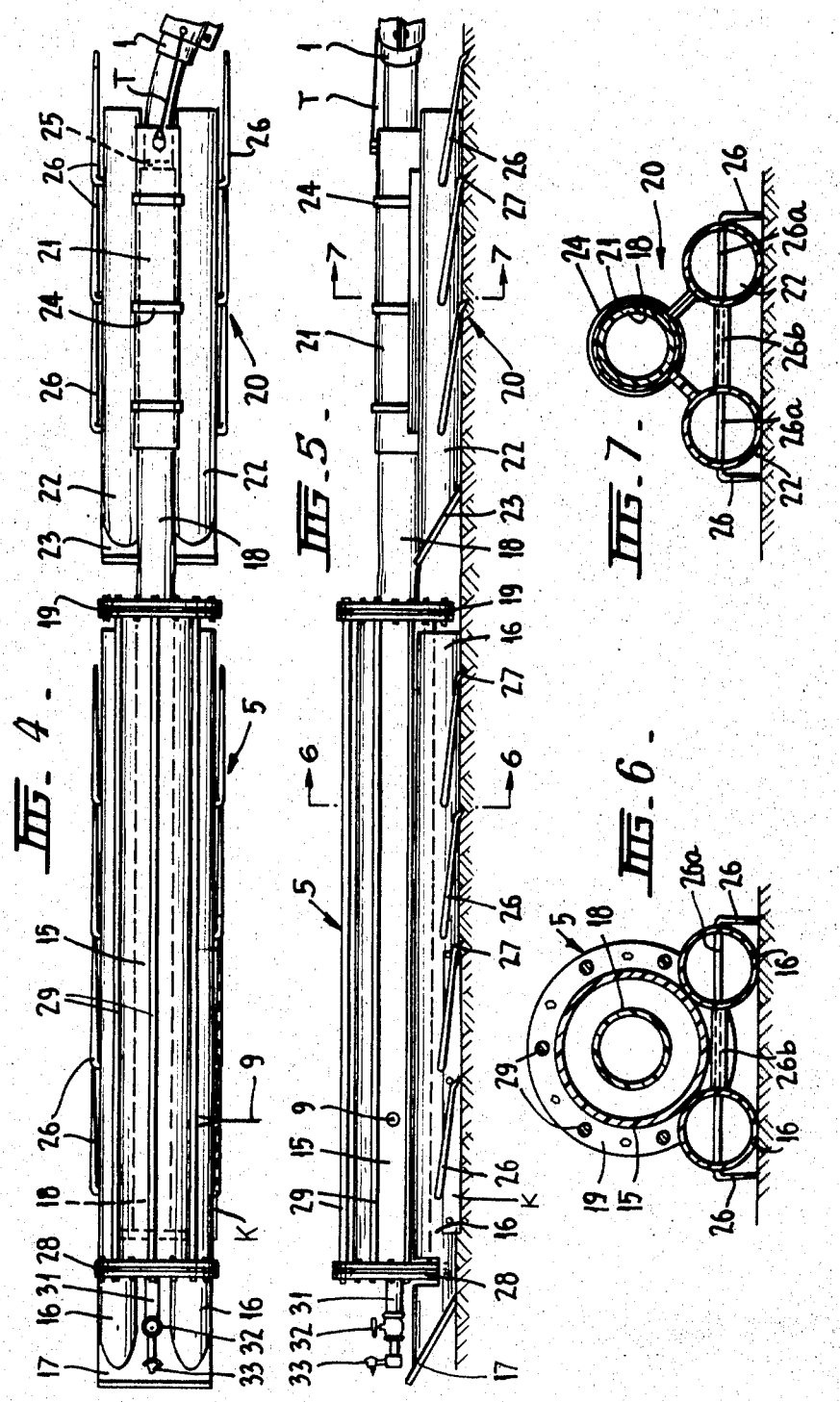

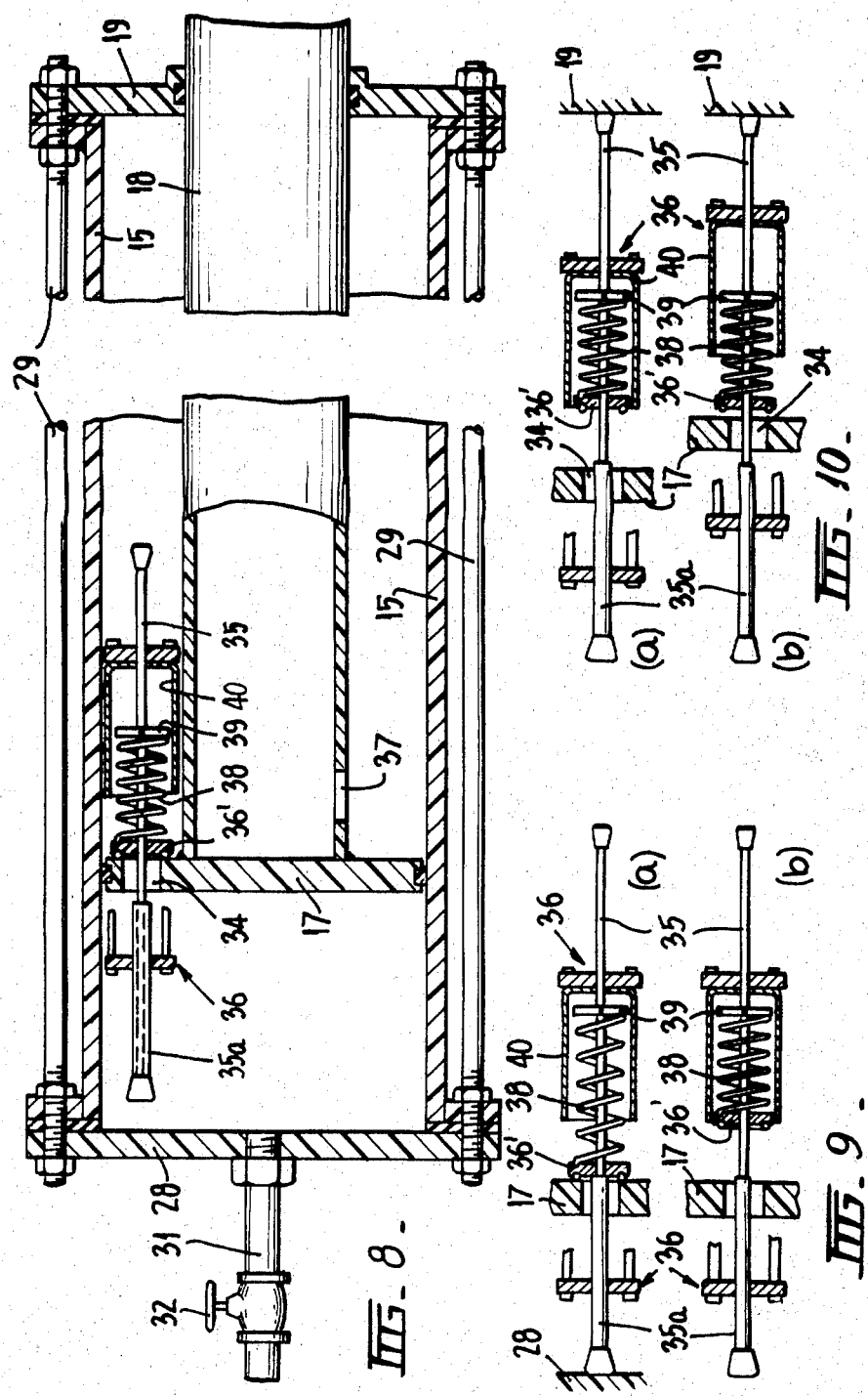

SPRINKLER IRRIGATION SYSTEMS

This invention relates to sprinkler irrigation systems for pastures and the like, and more particularly to an improved system having means for continuously changing the location of the sprinkler line in a predetermined area to be watered.

While several different sprinkler irrigation systems are presently available, each system suffers from certain disadvantages, either in terms of the capital cost of the system or in terms of the labor required to shift the system from one location to the next. The known systems fall broadly into four categories.

The first type comprises a series of pipes joined together with couplings to form a spray line. Sprinklers of one type or another are mounted at intervals usually thirty feet apart along the sprayline. In use, this system has the disadvantage that after watering one area, the line must be drained, manually disassembled and the components moved and reassembled at the next area. This system of sprinkler irrigation is suitable for small areas only, as the labor involved in shifting the sprayline is too costly and too inconvenient for larger acreages.

The second type of sprinkler system uses pipes and sprinklers similar to the first but the sprayline is mounted on skids or on dual castoring wheels which allow the drained line to be disconnected from its supply point and towed by tractor to the next area to be watered. However, since the spray line is generally required to be located 60 feet away from and parallel to the initial position there may be difficulties in moving the line into such a position by towing from one end.

An alternative to the end tow system is the side roll system where up to ten chains of sprayline may be rolled sideways by one man with the sprayline mounted on wheels each of whose axis of rotation is the sprayline itself. Whilst this method is easier to operate than the hand moved or end towed methods, it is more expensive and still involves uncoupling and recoupling the supply end of the sprayline to hydrants.

The third type of system is a sprayline supported four to six feet above the ground on wheeled or tracked supporting units at sixty to eighty feet intervals. The supply end of the sprayline is connected to a swivel hydrant supplied with water from an underground main. The entire radially disposed sprayline is power moved in a circular path around the central hydrant by means of water cylinders and pistons or electric motors, located on each of the supporting units. The sprayline may be up to six hundred feet in length to cover a circular area of approximately 30 acres. The cost of this automatic system is very high and is too expensive a system for pasture irrigation.

The fourth type of sprinkler system is a fixed or permanent system of underground pipes with sprinklers attached by vertical risers. Whilst this system requires minimum labor to operate, the cost of the materials is very high and this limits its application to valuable cash crops.

A further disadvantage with presently known sprinkler irrigation systems is that the area to be watered usually has to be surveyed and each installation custom designed by the manufacturer to achieve optimum results with minimum capital expenditure. This work and the resulting overheads add to the cost of sprinkler irrigation systems. If the survey and individual design could be reduced to a minimum, this would in turn lower the cost of sprinkler irrigation systems.

It is therefore an object of the present invention to provide a sprinkler irrigation system which, at least to a certain extent, overcomes the disadvantages of the known systems described above.

The invention provides in one aspect an irrigation system comprising an elongate sprayline adapted for connection at one end to a source of water under pressure, an hydraulic towing device connected to the other end of said sprayline, said towing device comprising a cylinder housing a piston having a piston rod which extends from said cylinder, valve means operable to cause said water under pressure to reciprocate said piston and piston rod relative to said cylinder, supporting means for said piston rod, said cylinder and supporting means each including a one-way essentially preventing movement of said cylinder and said piston rod in one and the same direction so that the towing device moves in a forward direction only.

In another aspect, the invention provides an irrigation system comprising an elongate sprayline or other water line adapted to be swivelly connected at one end to a source of water under pressure, a towing device connected to the other end of said line, said towing device being constrained to move in a substantially circular path by means of a tie line connected to said towing device and swivelly connected at the center of said circular path.

In either of the above aspects of the invention, there may be one or more similar towing devices arranged intermediate said towing device and the source of water, said sprayline extending between said devices and preferably tailing behind the devices in loops or bows extending between the devices.

The invention will now be more particularly described with reference to a preferred embodiment shown in the accompanying drawings. It is to be understood that while the embodiment relates to a system irrigating a circular area, the towing devices may be adapted to follow other paths.

FIG. 1 is a plan view of a sprinkler irrigation system embodying the invention;

FIG. 2 is an enlarged plan view of the swivel connection of the system of FIG. 1;

FIG. 3 is a sectional side elevation taken along line 3—3 of FIG. 2;

FIG. 4 is a plan view of outermost towing device used in the system;

FIG. 5 is a side elevation of the towing device;

Figure 11:
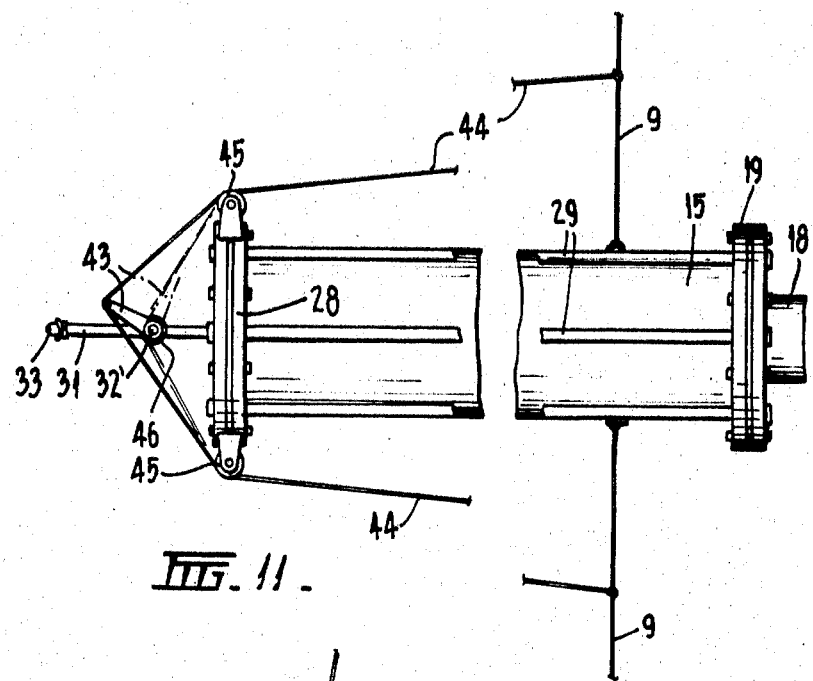
Figure 12:
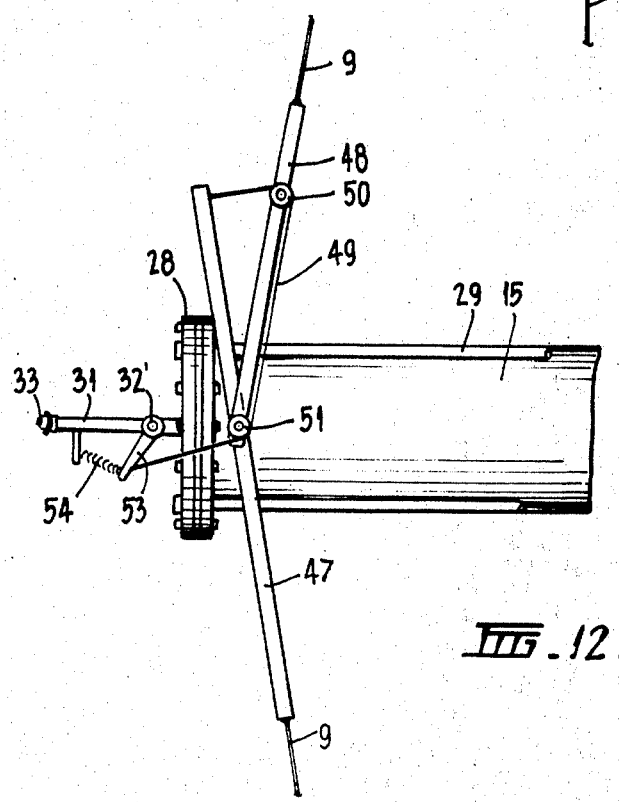
Figure 13:
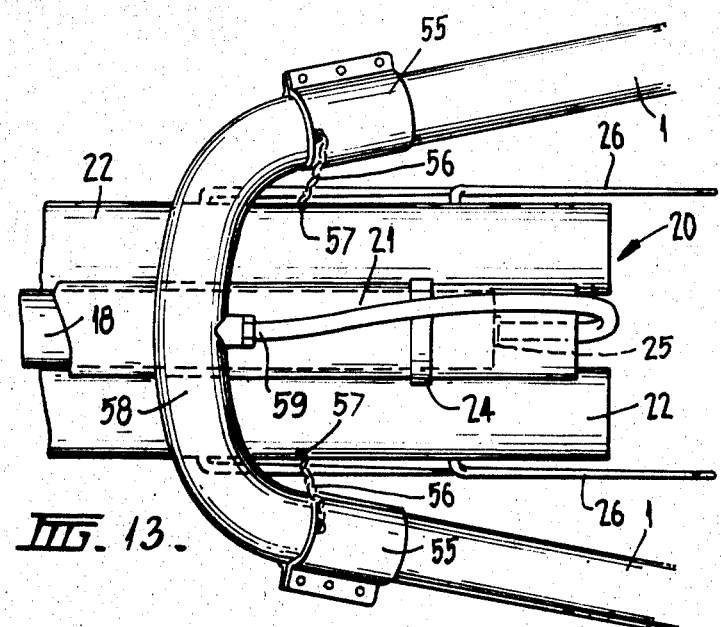
Figure 14:
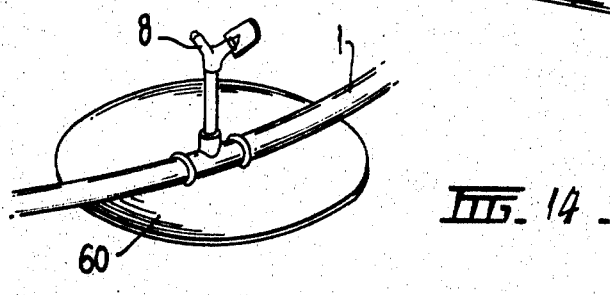

FIGS. 6 and 7 are sectional end elevations taken along lines 6—6 and 7—7 respectively of FIG. 5;

FIG. 8 is a fragmentary sectional side elevation of the cylinder of the towing device showing the piston in the "cylinder moving forwardly" condition;

FIGS. 9 and 10 are schematic diagrams showing the opening and closing action of the valve in the piston;

FIGS. 11 and 12 are fragmentary plan views of intermediate towing devices showing two alternative forms of control mechanisms;

FIG. 13 is a fragmentary plan view of the rear end of an intermediate towing device showing the attachment of the sprayline thereto;

FIG. 14 is a perspective view of a sprinkler on a sprayline, and

Figure 15:
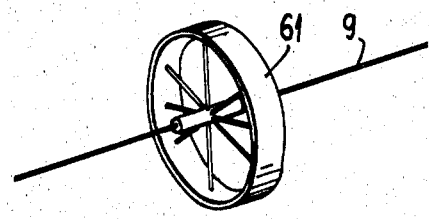

FIG. 15 is a perspective view of one means of supporting the tie wire of the system.

Referring firstly to FIGS. 1 to 3, the system embodying the invention includes a sprayline 1 connected at its innermost end to a rigid pipe 2 which is in turn connected, through a suitable flexible connector 3, to a swivel connection of a hydrant 4 located at the center of a circular area A to be watered.

The outer end of sprayline 1 is connected to an hydraulic towing device 5 and the intermediate portions of the line are connected to two similar towing devices 6 and 7 so that the sprayline 1 extends between the pipe 2 and the three towing devices in three approximately semi-circular trailing loops. Each sprayline loop has a plurality of spaced sprinkler units 8, such as that shown in FIG. 14.

The three towing devices 5, 6 and 7 are interconnected by a tie wire 9, looped at its inner end to engage the hydrant 4 and fixed to each of the towing devices. The tie wire 9 is maintained in tension by the towing devices 5, 6 and 7 and its function is to constrain the latter to move in circular paths about the swivel axis of the hydrant 4. It is believed that the towing device 5 will probably naturally maintain a circular path. However, if this is proved incorrect, the device 5 may have its nose skewed slightly outwardly of the circular path by a further tie wire extending from the wire 9 to the rear end of the towing device to pull this end inwardly of the circle or in some other suitable manner.

To prevent the radial force applied to pipe 2 by the dragging of sprayline 1 damaging the swivel joint, the hydrant 4 is surrounded by a ring 10 fixed to the ground by spikes as shown and the inner edge of the ring is engaged by a wheel 11, the vertical axle of which is rigidly fixed to the pipe 2. The pipe 2 is also supported above the ground by wheel or wheels 13, the flexible connector 3 allowing some movement of the pipe 2 due to irregularities in the ground surrounding the hydrant 4.

The three towing devices 5, 6 and 7, are substantially identical in construction so the outermost device 5 will now be described with reference to FIGS. 4 to 7. The towing device 5 comprises a cylinder 15 mounted on two tubular skids 16, in the manner shown in FIGS. 6, the skids 16 having a forwardly inclined nose member 17 attached thereto to prevent the skids 16 jamming on irregularities in the surface of the ground.

The cylinder 16 houses a piston 17 having a suitable seal (not shown) in its periphery and having a tubular piston rod 18 rigidly secured thereto which extends through an end plate 19 sealingly secured to the cylinder and supporting a suitable seal (FIG. 8) for the rod 18. A skid assembly 20 comprising a sleeve 21, two skids 22 connected to the sleeve 21 as shown and an inclined nose member 23 attached to the forward end of skids 22 is secured to the piston rod 18 by means of clamping bands 24 surrounding the sleeve 21. The end of rod 18 is closed except for an inlet fitting 25 for the connection of sprayline 1. The sprayline is also connected to the sleeve 21 by towing line T to prevent dragging forces being applied to fitting 25.

The skids 16 and 22 for the cylinder 15 and pistons rod 18 each support a plurality of one-way devices which essentially prevent rearward movement of both the cylinder 15 and piston rod skid assembly 20. In the present embodiment, each one-way device comprises a pair of trailing legs 26 interconnected by a rod 26a which passes through suitable holes or bearings in the skids and a sleeve 26b located between the skids. Each rod 26a extends transversely of the longitudinal axis of the cylinder 15 and piston rod 18 so that the legs 26 are free to pivot about the axis of the rod 26a. The trailing leg 26 has a bent end portion 27 which prevents the leg digging too far into the ground. Alternatively, a plate, stop or other depth control means is provided. It will be clear that any rearward force applied to either of the skids will cause a small amount of rearward movement until the legs 26 dig into the ground to resist such a force. Thus the legs 26 essentially prevent rearward movement of both skids and therefore the cylinder and piston rod.

Referring now to FIG. 8, it will be seen that the cylinder 15 is closed at its forward end by an end plate 28, similar to end plate 19, the two end plates being sealingly held in engagement with flanges on the cylinder by the bolts 29. A water discharge pipe 31 is secured in a threaded aperture in the plate 28. The pipe 31 is interrupted by a control valve 32 and terminates in a sprinkler head 33 so that the water discharged from the cylinder is utilized.

The piston 17 is formed with a water passage 34 and a valve assembly V is supported by the piston 17 as shown in FIG. 8. The valve assembly V comprises a valve stem 35 slidably mounted in a support 36 comprising two opposed rods passing through and fixed to piston 17 and plates through which the stem 35 passes. The stem at the forward side of the valve is surrounded by a sleeve 35a, the purpose of which will be explained. A valve 37 is slidably mounted on stem 35 and a tension spring 38 is secured thereto and to a washer 39 fixed to the stem. A shroud 40 which houses the valve 37 when open is secured to one of the plates of the support 36. The piston rod 18 is also formed with a water passage 37 for the delivery of water into the cylinder 15.

The operation of the towing device will be described with reference to FIGS. 8 and 9. In FIG. 8, the piston 17 is shown near the forward end of its stroke with the stem 35 about to engage end plate 28. Referring now to FIG. 9(a), the piston is at the forward end of its stroke with the stem 35 pushed to the right and the spring 38 extended and storing energy. At this time the sleeve 35a engages the valve to lift it slightly from its seat whereupon the spring 38 retracts the valve 37 rapidly into its shroud 40 (FIG. 9(b)) where it is protected from the influence of the water movement through passage 34. The length of stem 35 and sleeve 35a and the rating of spring 38 are selected so that at the time the valve 37 is first lifted from its seat, the force stored in spring 38 just exceeds the force of the water on the valve 37.

When the valve 37 is unseated, both sides of the piston are exposed to the same water pressure. However, since the area of the front face of piston 17 is far greater than that of the rear face, the water pressure will attempt to force the piston rearwardly. However, the one-way devices 26 on the piston rod skid assembly 20 dig into the ground and prevent any such movement so the cylinder 15 is forced forwardly. Even though the valve 32 is always open in the case of device 5 and intermittently open in the case of devices 6 and 7 and water discharged therefrom, the difference in areas of the piston faces is sufficient to overcome this. In addition the opening 34 is smaller than the opening in end plate 28.

At the other end of the piston stroke the stem 35 engages end plate 19 to move the valve towards the closed position (FIG. 10(a)). The valve 37 is closed on further movement of the stem. The piston is then pushed forwardly in the cylinder 15 which is held against rearward movement by the one-way devices 26 on the cylinder skids 16. Water is expelled through the pipe 31 so valve 32 controls the rate of forward movement of the piston 17 and thus the rate of movement of the towing device.

As mentioned above, the towing devices 5, 6 and 7 are interconnected by tie wire 9. Unless this tie wire is maintained approximately straight, the towing devices would not remain at their required distances from the hydrant and it is therefore necessary to make suitable provision to ensure that the towing devices remain approximately in line.

For this purpose, it is necessary for the average linear speeds of the devices to be proportional to their distances from the hydrant 4 so that if they have a common cycle time or frequency of operation, the length of the stroke of each piston could be adjusted so as to be proportional to the radial distance of the respective unit from the hydrant. While this would not ensure that the units remained in line, it would ensure that substantial misalignment would require an appreciable time.

In addition however, control devices are provided to limit the extent to which any intermediate towing device may move ahead of the tie line 9 connecting the hydrant to the outermost towing device and this is achieved by causing the resultant change in the angular positions of the different sections of the tie wire 9 to adjust a discharge valve at the forward ends of the cylinders to cause either a decrease or an increase in the speed of movement of the respective pistons.

The controller of FIG. 11 comprises a valve actuator 43 secured to the spindle of a 90° control valve 32'. The actuator 43 has its free end in contact with a control wire 44, say through an eyelet at the end of actuator 43, the control wire is secured to tie wire 9, which in this arrangement is secured near the rear end of cylinder 15, and is supported by pulleys 45 suitably mounted on the cylinder 15. A torsion spring 46 is fixed between actuator 43 and the valve body and biases the actuator to the open position of the valve 32'. Thus if the towing device falls behind the towing device 5, the change in position of the sections of the wire 9 on either side of the cylinder causes a slackening of control wire 44 and the spring 46 moves the actuator 43 to partly or fully open valve 32' to start that device moving or increase its rate of movement. Then when the device starts to overtake device 5, control wire 44 is drawn taut to move actuator 43 to partly or completely close the valve to slow or stop the towing device.

In the embodiment of FIG. 12, the tie wire 9 is connected directly to two arms 47, 48 each pivoted to the cylinder 15. Arm 47 extends well beyond its pivot nd has one end of a control wire 49 secured near its end. This wire 49 passes over a pulley 50 on arm 48 and pulley 51 on the pivot of both arms to a valve actuator 53 which is biassed towards the opening direction by spring means 54. The operation of this embodiment will be obvious from the drawing and the device functions in an identical manner to the embodiment of FIG. 11 to control the rate of movement of an intermediate towing device.

FIG. 13 shows one suitable way of connecting the sprayline 1 to the piston rods of the intermediate towing devices 6 or 7. The two sections of sprayline 1, connected by a length of flexible tubing 58 of similar diameter to the sprayline pipe, are secured to the skids 22 or the sleeve 23 by means of chains 56 connected at one end to an eyelet or hook 57 and at the other end to a clamp 55 securing the sections of sprayline 1 to tubing 58. This form of connection allows universal movement of the sections of line 1 relative to the towing device. A smaller diameter hose 59 connects the tubing 58 to the inlet fitting 25 on the piston rod 18.

In connecting of the sprayline 1 to the outer towing device 5 as described the dragging forces applied by the sprayline 1 to the device 5 are directed rearwardly and inwardly so that a lateral bending moment would be applied to the piston rod 18 which therefore would tend to bind and produce excessive wear in the seals of the piston and rod. This lateral bending moment may be resisted by a furrow wheel (not shown) secured to the skid assembly 20 and arranged behind towing device 5. This furrow wheel would be arranged so as to tend to pull the piston rod outwardly and thus counteract the inward pull of the sprayline 1.

The application of lateral forces to the cylinders 15 and the consequent reduction in the tension in tie wire 9 is resisted by the provision of a knife edge runner K secured to the cylinder skid 16 parallel thereto and extending slightly below the lower most point of the skid. The knife edge may be secured to the cylinder or may be replaced by a disc or other means.

To maintain the sprinklers 8 in an upright condition, a dished skid 60 may be fitted to the sprayline 1 or sprinkler 8 as shown in FIG. 14.

FIG. 15 shows a suitable support wheel 61 for tie wire 9 in systems where the distance between towing units is large.

The cylinders, piston rod, piston and skids are preferably formed from suitable plastics materials such as p.v.c. although other suitable materials may be used.

The sprayline is preferably formed of high density polyethylene hose slightly smaller in diameter than the piston rod, although suitable metal pipes provided with joints to allow the loops shown in FIG. 1 to be formed may be suitable. For irrigation of smaller areas smaller pipe(s) may be used and only one towing device may be required. Similarly, while the cylinder and piston rod are shown to be skid mounted, they may be supported by wheeled structures in which case the one-way device may be in the form of rachet devices fitted to the wheels. Alternatively, the cylinder may engage the ground directly or be mounted on a flat skid in which case the one-way devices may be secured to the cylinder by suitable mounting members.

While in the preferred embodiment the piston control valve is mounted in the piston, another form of valve may be mounted externally of or formed integrally with the cylinder to achieve the necessary application of water pressure to opposite sides of the piston.

It will also be appreciated that the invention may be applicable to irrigation of playing fields or domestic lawns. For such areas, or smaller pastures, one towing device may suffice. Similarly the towing device may be in the form of a child's toy driven by the household water supply and the word "sprayline" as used in the appended claims should be understood to include domestic hoses.

As an alternative to the ring 10 and wheel 11 arrangement, the hydrant may simply be suitably braced against the radial force.

To reduce the tensile forces applied to the piston rod, a tie rod under tension may be secured between the piston 17 and the closed end of the piston rod.

Provision may be made to exclude dirt or dust from contacting the piston rod. For example, a flexible boat may be connected between the cylinder and piston rod skid assembly or provision may be made to continually wash the piston rod.

We claim:

1. An irrigation system comprising an elongate flexible sprayline for connection at one end to a source of water under pressure, an hydraulic towing device connected to the other end of said sprayline and driven by the water therein, said sprayline being disposed to trail behind said towing device, said towing device comprising a cylinder housing as a piston, said piston having a piston rod which extends from said cylinder, valve means operable to cause said water under pressure to reciprocate said piston and piston rod relative to said cylinder, supporting means for said piston rod, said towing device including means for discharging the water therefrom, said cylinder and said supporting means each including a one-way means essentially preventing movement of said cylinder and said piston rods in a rearward direction so that the towing device will move in a forward direction only, and a tie line having means for swivelly securing same to an anchor means in the area to be irrigated and said tie line being secured to said towing device to constrain it to move in a generally circular path around the area to be irrigated.

2. An irrigation system according to claim 1, wherein said cylinder is mounted on supporting means having said one-way device secured thereto.

3. An irrigation system according to claim 1, further including means secured to said piston rod supporting means or to said piston rod and engaging the ground to pull the piston rod in he opposite direction to the pull of the sprayline thereon to counteract the application of lateral bending moments to said rod by said sprayline.

4. An irrigation system according to claim 1, wherein said valve means comprises a valve in said piston, said piston rod being tubular and being connected at its free end to said sprayline and having a water delivery passage therein opening to said cylinder, said valve having means engaged by the ends of the cylinder at the end of each piston stroke to operate the valve to change the direction of movement of the piston relative to the cylinder, and a normally open valve at forward end of the cylinder for controlling the speed of discharge of water from the cylinder and thus the rate of movement of the towing device.

5. An irrigation system according to claim 4, wherein said valve includes a valve body slidably mounted on a stem adapted to engage the ends of the cylinder to actuate the valve, a tension spring secured to said valve body and to said stem, and a shroud for housing the valve body in the fully open position, said opening of said valve occurring when the force stored in said spring by movement of said stem exceeds the force of the water on the valve body.

6. An irrigation system according to claim 4, wherein said cylinder and said piston rod are supported on skids, said one-way devices including a plurality of trailing legs pivotally secured to said skids adapted to dig into the ground to essentially prevent rearward movement of said skids and which are easily withdrawn on forward movement of said skids.

7. An irrigation system according to claim 4, further including spring means secured to said valve and said means engaged by the cylinder ends and operable to store energy immediately prior to at least the opening movement of said valve, said spring means acting to actuate the valve when the energy stored in the spring exceeds the force of water on the valve.

8. An irrigation system according to claim 1 further comprising one or more similar hydraulic towing devices connected to said waterline intermediate said towing device and said source, said towing devices being interconnected by said tie line, said intermediate towing devices each having a control valve and actuating means therefore actuated by a change in angular position of said tie line relative to the respective towing device to ensure that the towing devices remain substantially in line with each other.

9. An irrigation system according to claim 8, wherein said actuating means comprises an actuator connected to the control valve, a control wire connected at each end to said tie line and passing over pulleys arranged at either side of the actuator and connected thereto, and spring means biasing the valve actuator in the opening direction.

10. An irrigation system according to claim 8, wherein said actuating means comprises an actuator connected to the control valve, pivoted levers having secured at one end to the tie line, and a control wire secured to one lever, passing over a pulley on the other lever, a pulley on the pivot of said levers and connected to said actuator.

11. An irrigation system according to claim 8, wherein the connection of said sprayline to the intermediate towing devices comprises a flexible pipe to which the parts of the sprayline are connected extending over the piston rod and secured thereto and/or to said supporting means therefore, a further pipe communicating with said flexible pipe and said piston rod to deliver water thereto, said sprayline parts being universally connected to said piston rod or said supporting means.

12. An irrigation system comprising an elongate sprayline for connection at one end to a source of water under pressure, an hydraulic towing device connected to the other end of said sprayline and driven by the water therein, said towing device comprising a cylinder housing a piston having a piston rod which extends from said cylinder, valve means operable to cause said water under pressure to reciprocate said piston and piston rod relative to said cylinder supporting means for said piston rod, said towing device including means for discharging water therefrom, said cylinder and supporting means each including a one-way means essentially preventing movement of said cylinder and said piston rod in a rearward direction so that the towing device moves in a forward direction only, said towing device having a member secured to said cylinder parallel thereto for engaging the ground to a depth a small distance below the lower most point of said towing device to resist lateral forces applied to said cylinder.

* * * * *